(12) United States Patent
Williams

(10) Patent No.: US 8,458,852 B2
(45) Date of Patent: Jun. 11, 2013

(54) HEAT EXCHANGE CONFIGURATION FOR USE IN A MOBILE SYSTEM CLEANING APPARATUS

(75) Inventor: Ron Williams, Littleton, CO (US)

(73) Assignee: Kärcher North America, Inc., Englewood, CO (US)

( * ) Notice: Subject to any disclaimer, the term of this patent is extended or adjusted under 35 U.S.C. 154(b) by 463 days.

(21) Appl. No.: 12/783,691

(22) Filed: May 20, 2010

(65) Prior Publication Data

US 2010/0294459 A1    Nov. 25, 2010

Related U.S. Application Data

(60) Provisional application No. 61/180,355, filed on May 21, 2009.

(51) Int. Cl.
   *A47L 11/34*    (2006.01)

(52) U.S. Cl.
   USPC ............. 15/321; 134/105; 165/139; 165/145; 239/129; 239/130; 239/135

(58) Field of Classification Search
   USPC ................ 15/319, 339, 340.1, 320, 321, 322, 15/302; 165/139, 145; 134/105, 108, 172, 134/174, 184; 239/13, 128–131, 135–137
   See application file for complete search history.

(56) References Cited

U.S. PATENT DOCUMENTS

| | | | |
|---|---|---|---|
| 1,814,010 A * | 7/1931 | Snow | 165/83 |
| 2,375,702 A * | 5/1945 | Smith | 165/145 |
| 4,109,340 A | 8/1978 | Bates | |
| 4,284,127 A | 8/1981 | Collier et al. | |
| 4,441,549 A * | 4/1984 | Vasiliev et al. | 165/145 |
| 4,443,909 A | 4/1984 | Cameron | |
| 4,475,587 A * | 10/1984 | Vasiliev et al. | 165/140 |
| 4,593,753 A | 6/1986 | McConnell | |
| 4,600,144 A | 7/1986 | Zelczer | |
| 4,940,082 A | 7/1990 | Roden | |
| 4,949,424 A * | 8/1990 | Shero | 15/321 |
| 4,991,254 A | 2/1991 | Roden et al. | |
| 4,993,367 A | 2/1991 | Kehrer | |
| 5,134,945 A | 8/1992 | Reimlinger et al. | |
| 5,205,521 A | 4/1993 | Smith | |
| 5,388,609 A | 2/1995 | Ghio et al. | |
| 5,421,533 A | 6/1995 | Scott et al. | |
| 5,469,598 A * | 11/1995 | Sales | 15/321 |
| 5,568,824 A | 10/1996 | Cordrey | |
| 5,606,768 A | 3/1997 | Sundberg | |
| 5,787,923 A | 8/1998 | Shea et al. | |

(Continued)

*Primary Examiner* — Mark Spisich
*Assistant Examiner* — Andrew A Horton
(74) *Attorney, Agent, or Firm* — Sheridan Ross P.C.

(57) ABSTRACT

The present invention relates to a system of creating and applying a heated cleaning fluid to a surface. The system includes a housing with a first, a second and a third exhaust gas opening. A first, second, and third heat exchanger are enclosed within the housing. The first and second exchangers are serially arranged, while the third is at an angle relative to the first and second and directly adjacent to the first opening. Super heated exhaust gas flows through first opening and third exchanger. Heated gas flows through the second opening and passes below the third exchanger. Super heated exhaust gas exiting the third exchanger mixes with the heated gas in a mixing chamber of the housing, which is then supplied to the first and second exchangers. Fluid passes through the three exchangers and exits the third exchanger heated. That heated fluid passes to a cleaning wand for application.

22 Claims, 4 Drawing Sheets

U.S. PATENT DOCUMENTS

| | | | |
|---|---|---|---|
| 5,871,152 A | 2/1999 | Saney | |
| 5,934,314 A | 8/1999 | Spear et al. | |
| 6,050,290 A | 4/2000 | Yacobi et al. | |
| 6,141,961 A | 11/2000 | Rinckel | |
| 6,182,328 B1 | 2/2001 | Roden | |
| 6,338,360 B2 | 1/2002 | Spear et al. | |
| 6,675,437 B1 | 1/2004 | York | |
| 6,789,564 B1 | 9/2004 | Wu | |
| 6,905,087 B2 | 6/2005 | Chen | |
| 6,932,106 B1 | 8/2005 | Wang | |
| 6,945,271 B2 | 9/2005 | Huang | |
| 6,955,213 B2 | 10/2005 | Stonehouse et al. | |
| 6,978,960 B2 | 12/2005 | Schaller | |
| 7,032,577 B2 | 4/2006 | Rosin et al. | |
| 7,036,565 B2 | 5/2006 | Brost et al. | |
| 7,108,218 B2 | 9/2006 | Chapman et al. | |
| 7,150,425 B2 | 12/2006 | Banaszkiewicz et al. | |
| 7,210,647 B2 | 5/2007 | Dion | |
| 7,377,289 B1 | 5/2008 | English et al. | |
| 7,610,949 B2 | 11/2009 | Palanchon | |
| 2002/0190137 A1* | 12/2002 | Cheng | 239/128 |
| 2003/0229963 A1 | 12/2003 | Broehl et al. | |
| 2004/0134649 A1 | 7/2004 | Richardson et al. | |
| 2005/0056402 A1 | 3/2005 | Han et al. | |
| 2005/0210620 A1 | 9/2005 | VanOrden et al. | |
| 2006/0032613 A1 | 2/2006 | Brost et al. | |
| 2007/0061996 A1 | 3/2007 | Boone | |
| 2008/0035304 A1 | 2/2008 | Roden et al. | |

* cited by examiner

HEAT EXCHANGE CONFIGURATION FOR USE IN A MOBILE SYSTEM CLEANING APPARATUS

CROSS-REFERENCE TO RELATED APPLICATION

This application claims the benefit of U.S. Provisional Patent Application Ser. No. 61/180,355 filed May 21, 2009 entitled "Heat Exchange Configuration for Use in a Mobile System Cleaning Apparatus," which is incorporated by reference in its entirety herein.

FIELD OF THE INVENTION

The present invention relates to a new and beneficial configuration of three heat exchange cores housed within a compact housing and used to produce heated fluid, steam and or a heated cleaning solution in portable cleaning systems. The present invention makes highly efficient use of heat sources available in a mobile cleaning system to quickly elevate fluid to be used in the system to a desired working temperature and to maintain that fluid at a stable working temperature throughout a variety of working conditions.

BACKGROUND OF THE INVENTION

Steam cleaning devices are often used to clean items, such as rugs, carpet, or upholstered furniture. Such devices are usually mobile and are used at the site of the cleaning job. As is understood by those working in the art, cleaning fluids used in such devices typically consist of a mixture of heated water, steam and a chemical solution that is delivered to an article to be cleaned by a cleaning wand assembly. While these are typical fluids, other fluids or combination of fluids, could certainly be used in a given environment. In any case, fluid supplied to the cleaning wand assembly often and preferably is heated substantially and that fluid temperature is to be maintained over a variety of operating conditions.

DESCRIPTION OF THE PRIOR ART

To heat fluid, prior art steam cleaning devices typically pass preheated fluid through typical heat exchangers, causing heat applied to the exchangers (typically in the form of a heated gas) to pass to the fluid, resulting in heated fluid. The thermodynamic properties and functionality of heat exchangers, as well as the design and implementation of heat exchangers, is well within the working knowledge of those working in this art. These artisans also understand that typically it is a heated gas which is placed in contact with the external surfaces of the heat exchanger, causing heat to transfer from the gas to the exchanger. Such gases can be super heated, such as exhaust gas exiting an internal combustion engine or merely heated, such as exhaust gas generated by vacuum pumps, etc.

As one working in the field would expect, heated fluid exits heat exchangers and is typically directed to a cleaning wand assembly for application to an article to be cleaned. The cleaning wand assembly typically contains a trigger mechanism for controlling when the heated fluid exits the wand, typically through a jet or other orifice located at the end of the wand itself. The wand also often may contain a vacuum suction inlet port. That port is typically in communication with a spent fluid recovery tank. That port is typically used to recover solid fluid and to direct that fluid to the waste water tank. As those working in the field understand, the tank is typically kept under vacuum by an engine driven blower, vacuum pumps, etc. and this vacuum is supplied to the suction inlet port by appropriate conduit pipe, etc.

Steam cleaning devices additionally often contain a thermostat (usually set at a predetermined temperature), placed downstream of the heat exchanger(s) in order to gauge the temperature of the heated fluid before it exits through the hand held wand. If the heated fluid destined to exit the heat exchanger exceeds the predetermined temperature of the thermostat, often the entire device will be directed to shut down. The device then needs to be sufficiently cooled, typically by waiting an appropriate amount of time, before restarting the device, or evacuating the device and refilling it with fresh, cool fluid. Accordingly, there is a great need to constantly monitor and control the temperature of fluid used in the system.

It has been observed that the trigger mechanism in the wand of prior art devices can create two additional problems in a typical cleaning environment. First, overheating of the fluid regularly occurs due to constant activation and deactivation of the trigger mechanism in the wand. Specifically, when the trigger mechanism is deactivated, heated fluid does not exit the wand, stagnating in the wand, heat exchanger(s) etc. When this occurs, the fluid often becomes overheated, exceeds the predetermined set temperature of the thermostat, causing the thermostat to shut down the device.

Second, periodic or sporadic use of the trigger mechanism can create wide temperature fluctuations in fluid exiting the device. When the trigger mechanism is deactivated and the heated fluid supply is not allowed to exit the wand, the fluid temperature again rises in the heat exchanger(s). Even if not overheated to beyond the predetermined temperature of the thermostat, the heated fluid leaving the wand will often momentarily be super heated when the trigger mechanism is activated. Subsequently, the fluid temperature drops and stabilizes. These fluid temperature fluctuations negatively affect cleaning characteristics of cleaning systems, as is well known to those working in the art. Thus, there is a need for a system which will minimize, if not eliminate, these undesirable temperature fluctuations.

As those working in the field understand, there are a number of prior art devices which use organic heat sources, in combination with heat exchangers, to create heated fluid. For instance, U.S. Pat. No. 4,949,424 to Shero is such a system, whose disclosure is incorporated here by this reference. Specifically, Shero directs incoming fluid through a first heat exchanger, which heats the fluid to a temperature in the range of about 100 to 120° Fahrenheit. That partially heated fluid is then directed through a second heat exchanger, which is placed parallel to the first exchanger and which heats the fluid to a range of about 200° to 230° Fahrenheit. After the fluid is directed through both heat exchangers sequentially, a portion of the volume of the heated fluid is diverted back into the incoming fluid supply, causing a continuously circulating flow of somewhat heated fluid, raising the incoming cold fluid temperature by approximately 5° to 20° Fahrenheit, and helping to control heat fluctuations and the momentary burst of superheated water exiting the end of the wand when the trigger mechanism is initially activated. However, while the disclosed device certainly controls fluid temperature fluctuations better than some previous devices, it still does not provide for optimum fluid temperature fluctuation control, nor does the disclosed device efficiently and effectively utilize organic sources of heated and super heated gases to constantly heat fluid.

U.S. Pat. No. 5,469,598 to Sales discloses a marginally more efficient system for heating and maintaining the heat of incoming fluids and is incorporated into this disclosure by this reference. However, the device of Sales is not significantly better than that disclosed in Shero and, as those working in the field understand, there is still a great need for a system which will provide for optimal fluid temperature fluctuation control, efficient utilization of organic sources of heated and super heated gases and timely and consistent production of heated fluids.

In Sales, super heated exhaust gas from an internal combustion engine is a main source of heat supplied to primary heat exchangers used to heat incoming fluid. These primary exchangers are configured in parallel and sequentially heat the fluid. After being initially directed through the two heat exchangers, exhaust gas is directed through a conduit and towards a third heat exchanger. Residual heat from recovered waste water, steam and exhaust gas from a vacuum pump are also collected and directed to the third heat exchanger. All these secondary sources of heat merge (i.e. the somewhat cooled but still warm exhaust gas, a vacuum pump exhaust gas, heated gas relating to recovered waste water and steam) together and are directed through the third heat exchanger and used to preheat the cold fluid supply.

Though better then prior art devices, the device of Sales still wastes a substantial amount of available heat which could be used to heat fluid. For instance, the secondary heat sources are at different temperatures at the time they are exposed to each other and are allowed to cool each other due to the distance the heat must travel in the system before being applied to the third heat exchanger. Obviously this results in substantial dilution of the temperature of the secondary heat sources. Two problems arise from this dilution. First, the overall temperature of the heated fluid decreases substantially in proportion to the period of time the device is in use. In fact, the overall temperature of the heated fluid can decrease more than 100° Fahrenheit over a half hour period of use, negatively effecting temperature stability. Second, the temperature of the heated fluid also fluctuates substantially in proportion to the period of time that the triggering mechanism of the wand is activated.

Specifically, these inventors have discovered that during delivery of heated fluid for a cycle period of 20 seconds, the temperature of the fluid in the prior art device fluctuated by approximately 30° Fahrenheit. Such fluctuations are undesirable and there is a long felt but unsolved need for a device that avoids these deficiencies. There is also a need for a device which efficiently utilizes super heated engine exhaust gas, in combination with secondary heat sources, to heat fluid to a desired temperature and to maintain that fluid at a more constant temperature through a variety of cleaning environments than is presently available.

SUMMARY OF THE INVENTION

It is an object of the present invention to provide an apparatus that utilizes organic heat sources typically found on a steam cleaning device more efficiently and effectively than prior art devices to produce heated fluid which exhibits a higher heat sustainable and constant temperature throughout a variety of operational environments. It is a further object of the present invention to avoid the fluctuations and instability of the temperature of the heated fluid both when the device is in constant use over time, and when a wand triggering mechanism is periodically cycled that are present in prior art devices. These and other advantages are achieved by the device of the present invention.

The present invention preferably includes a primary super heated gas generating means, such as exhaust from an internal combustion engine, and a heated gas generating means, such as a vacuum pump exchange. The preferred device also includes a fluid supply system, a vacuum generator for recovering dirty fluid, and a cleaning tool assembly for the delivery of heated fluid to a surface to be cleaned. It should be understood by those skilled in the art that a cleaning wand assembly could be replaced by any cleaning tool such a triggered jet, etc.

The present invention also preferably includes a common housing to enclose a first and a second heat exchanger, which are in sequential arrangement, as well as a third heat exchanger. The third heat exchanger is preferably placed at an angle relative to the first and second heat exchangers. Contrary to the prior art, the third heat exchanger is exposed to super heated exhaust gas received directly from the internal combustion engine before being mixed with the cooler heated gases generated by a vacuum, etc. Indeed, it is only after traveling through the angled third heat exchanger that the exhaust gas and vacuum blower exhaust gases mix and caused to pass over the two remaining heat exchangers located within the housing.

The novel arrangement of these exchangers, in combination with the novel approach of applying heated and super heated gases thereto as described herein, limits the amount of temperature dilution of the heated gases used to heat fluid and thus the initial fluid supply will be heated to much higher temperature than previously achievable, while maintaining a streamlined, cost efficient design. Also, because the overall temperature used to preheat an incoming fluid supply is much higher than with prior art systems, the overall temperature of the heated fluid that is delivered from the wand assembly will constantly be higher than known of in prior art devices. In fact, the inventors have determined that the temperature of the overall heated fluid can be approximately 375° Fahrenheit, compared to approximately 250° Fahrenheit typically achieved by prior art devices. Additionally, the fluctuations in heated fluid temperature when the wand's triggering mechanism is activated is decreased substantially, by approximately 15° Fahrenheit in a 20 second cycle period and approximately 10° Fahrenheit in a 10 second cycle cleaning period.

DETAILED DESCRIPTION

As required, detailed embodiments of the present invention are disclosed herein; however, it is to be understood that the disclosed embodiments are merely exemplary of the invention, which may be embodied in various forms. Therefore, specific structural and functional details herein are not to be interpreted as limiting, but merely as a basis for the claim and as a representative basis for teaching one skilled in the art to variously employ the present invention in virtually any appropriately detailed structure.

Figure 1:
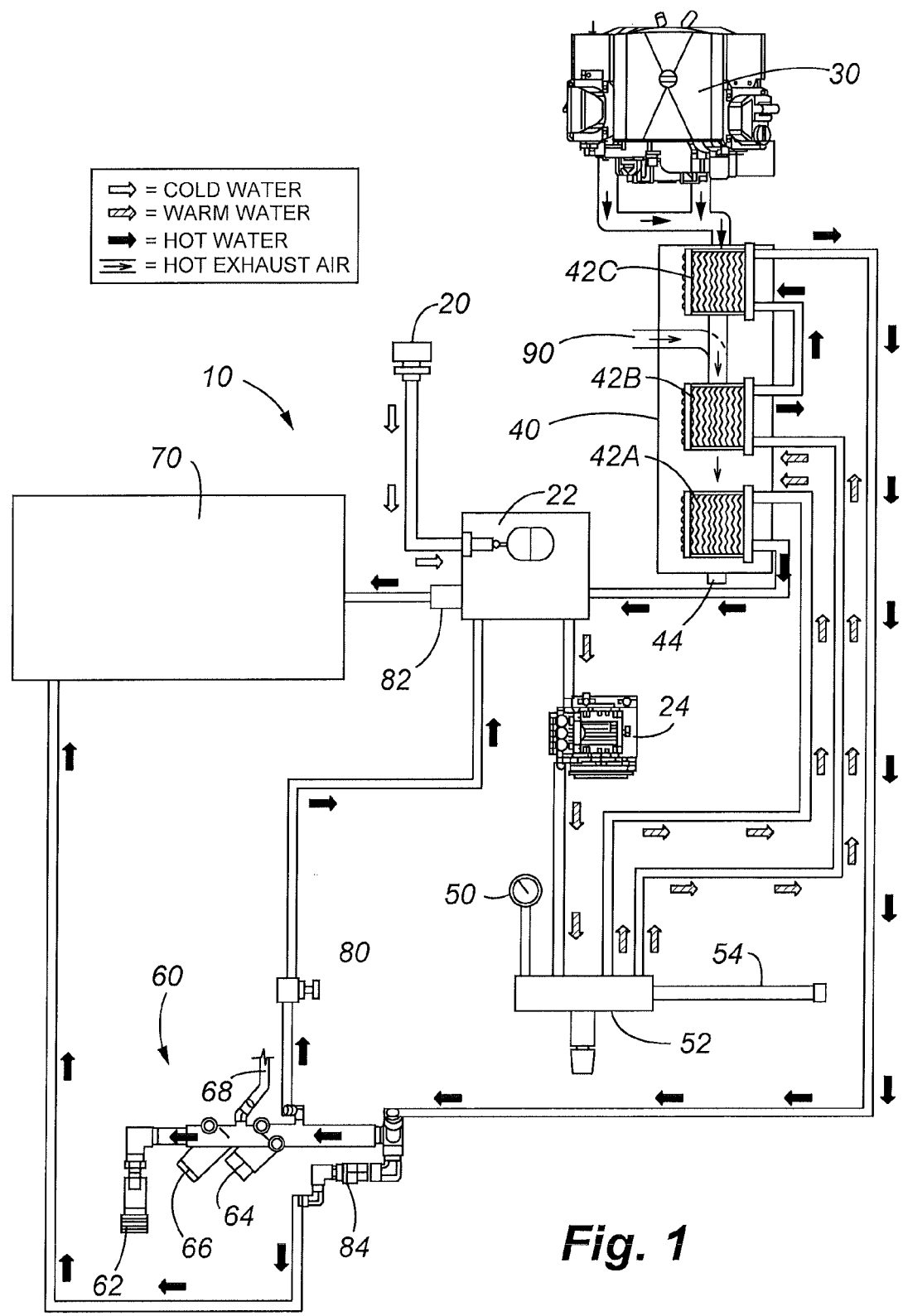
FIG. 1 is a schematic view of a cleaning apparatus in accordance with the present invention.

The mobile cleaning apparatus 10 (typically installed within a van or truck) of the present invention is shown in FIG. 1. An incoming fluid supply for use in the apparatus flows through inlet 20 to the fluid box 22, which is a storage apparatus for initially holding incoming cold fluid and later preheated fluid which is used in the cleaning process. As one of skill in the art will understand from review of the drawing, the fluid coming in from the inlet 20, typically water, can be held in the fluid box and mixed with preheated fluid to create a preheated supply of fluid for use by the overall system. A pump 24 moves fluid from the fluid box 22 for heating and use throughout the system.

A heat generating unit 30, such as an internal combustion engine, serves as the main source of super heated gas for heating fluid. Exhaust gases generated by the heat generating unit 30 are supplied to a housing 40. That housing contains at least three heat exchangers 42(*a*),(*b*) and (*c*). These exchangers are of common construction and typical in the industry. When in operation, the heat generating unit 30 produces super heated exhaust gas and the vacuum pump produces heated exhaust gas, and both these gases flow into the housing 40 (explained in detail below).

A cleaning wand or tool (not shown) related to wand assembly 60 serves as the outlet for the heated fluid. It is understood by those skilled in the art that the cleaning wand of wand assembly 60 could be replaced by any appropriate cleaning tool, such as a triggered jet, etc. A check valve 64 regulates flow of heated fluid which is directed through a solution outlet 62 and ultimately a wand. When the trigger mechanism of the cleaning wand (not shown) is activated, the check valve 64 will allow heated fluid to flow through the solution outlet 62 of the wand assembly 60. A chemical injection system 68 can inject a chemical solution into the hot fluid, providing for great flexibility in creating cleaning solutions which ultimately exit the cleaning wand of wand assembly 60. A cleaning solution screen part 66 is also provided so that a user can constantly monitor the composition and/or temperature of cleaning solution which will exit the wand.

A vacuum unit (not shown), such as a vacuum pump, is used as part of an overall system to recover spent cleaning solution which deposits spent solution into the waste fluid recovery tank 70 for storage. It is believed that those skilled in the art understand how these type of vacuum systems operate in portable cleaning system environments and they will not be further explained here. Hot air from the vacuum unit 90 is also recovered and directed towards the housing 40 to further heat an incoming fluid supply.

The cleaning apparatus of FIG. 1 additionally may preferably include a temperature control valve 80 which is set to a predetermined temperature. Typically, if the trigger mechanism of the cleaning wand of the wand assembly 60 is not activated for a period of time, hot fluid will stagnate and exceed the predetermined temperature set on the temperature control valve 80. When that occurs, the temperature relief valve 82 opens, allowing hot fluid to flow into the waste fluid recovery tank 70. Additionally, a temperature balance orifice 84, placed in line with and before the cleaning wand of the wand assembly 60, will also direct fluid to the fluid box 22.

A pressure gauge 50 measures the pressure of fluid as it is being pumped by the water pump 24. A pressure regulator 52 can constantly maintain and/or adjust the pressure of the fluid being supplied to the cleaning wand of the wand assembly 60 to facilitate desired cleaning operations as set by the technician or operator. The pressure regulator 52 is of conventional design and is generally understood by those working in this art field. A pulse hose 54 attached to the pressure regulator 52 provides protection from fluctuations in pressure while the cleaning apparatus 10 is in operation.

Figure 2:
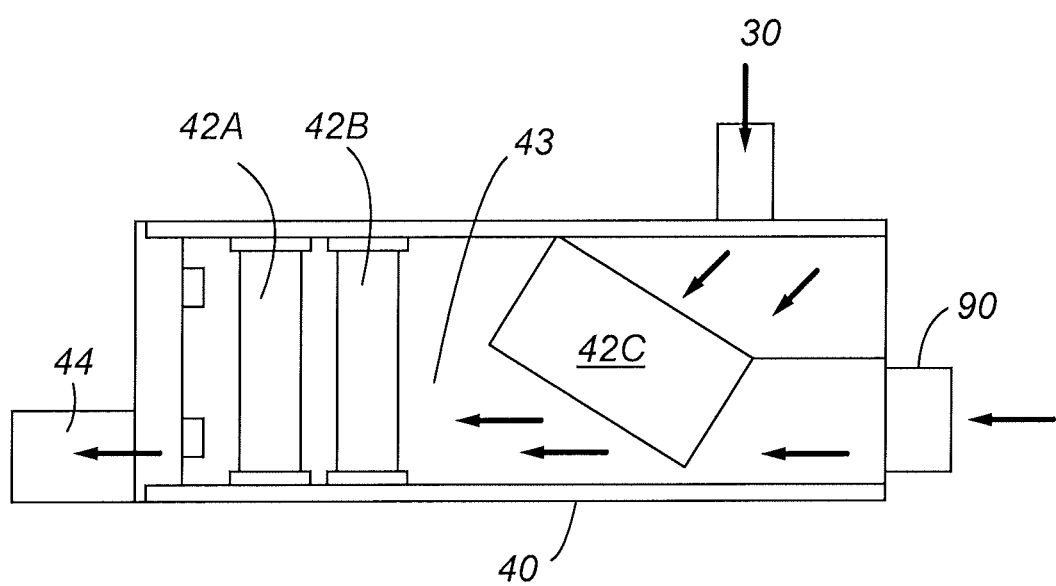
FIG. 2 is a schematic view of the housing, heat exchangers and flow of various heated gases to and through the housing and exchangers.

As shown in FIG. 2, the housing 40 is described in detail and contains at least three heat exchangers 42(*a*), (*b*) and (*c*). Two of these heat exchangers, 42(*a*) and 42(*b*), are placed in a sequential relationship relative to each other. The third heat exchanger 42(*c*) is positioned at an angle relative to the first and second heat exchangers 42(*a*) and (*b*). Hot air from the vacuum unit 90 flows into the housing 40 below heat exchanger 42(*c*) and into a mixing chamber 43 of the housing 40 before contacting heat exchanger 42(*b*). Super heated exhaust gas from the heat generating unit 30 is directed through the angled heat exchanger 42(*c*) and mixes with the heated gases in mixing chamber 43. The mixed heated gases next pass through heat exchangers 42(*b*) and finally 42(*a*) and further heat the fluid as it passes through those heat exchanger before exiting housing 40 through exhaust port 44.

As will be understood by those of skill in the art, the hot exhaust gas from the heat generating unit 30 need only travel a short distance before reaching the angled third heat exchanger 42(*c*), resulting in super heated gas being allowed to pass through heat exchanger 42(*c*) before that gas is cooled and exposed to the lower temperature hot exchange gas generated by the vacuum unit 90. Thus, when the hot exhaust gas (having lost some heat in preheating fluid in exchanger 42(*c*)) and hot air from the vacuum unit 90 are mixed, the overall heat transferred to the heat exchangers 42(*b*) and (*a*) is of a higher temperature than the gases presented to the heat exchangers of the prior art, resulting in a final fluid with a higher initial temperature and reducing fluctuations in temperature when the cleaning apparatus 10 is in operation.

The arrangement of the three heat exchangers 42(*a*), (*b*) and (*c*) in housing 40, with the third heat exchanger 42(*c*) positioned at an angle relative to the first and second heat exchangers 42(*a*) and (*b*), more efficiently uses available heat from various organic exhaust gases of the overall system in comparison to how those gases are used in prior art devices. First, as all three heat exchangers 42(*a*), (*b*) and (*c*) are typically and preferably placed within the housing in close proximity, the super heated exhaust gas from the heat generating unit 30 need only travel a short distance before being exposed to and mixed with the hot air from the vacuum unit 90. Thus, the exhaust gas will not lose substantial heat energy before being exposed to the hot but generally cooler air of the vacuum unit 90. Second, because the super heated exhaust gas is diverted first to the angled third heat exchanger 42(*c*), it is not immediately exposed to the cooler air from the vacuum unit 90, allowing the exhaust gas to remain at substantially the same temperature it had been upon leaving the heat generating unit 30, causing the combination of the hot exhaust gas and hot air from the vacuum unit 90 to also remain at an overall higher temperature. This was not achieved in prior art devices. Since there is less temperature dilution due to the length of travel and immediate exposure of the main heat source to other heat sources, the heated fluid, and resulting heated fluid that is delivered from the cleaning wand of the wand assembly 60, is at a higher overall temperature, preferably initially at about 375° Fahrenheit, compared to approximately 250° Fahrenheit as found in prior art devices. This initial temperature differentiation is shown on the charts of FIGS. 3 and 4. Indeed, the inventor learned that the configuration of heat exchangers, packaged in a single unitized housing, in combination with the application of super heated and heated gases in the described manner, resulted in approximately a 30% increase in overall initial temperature of the heated fluid.

Figure 3:
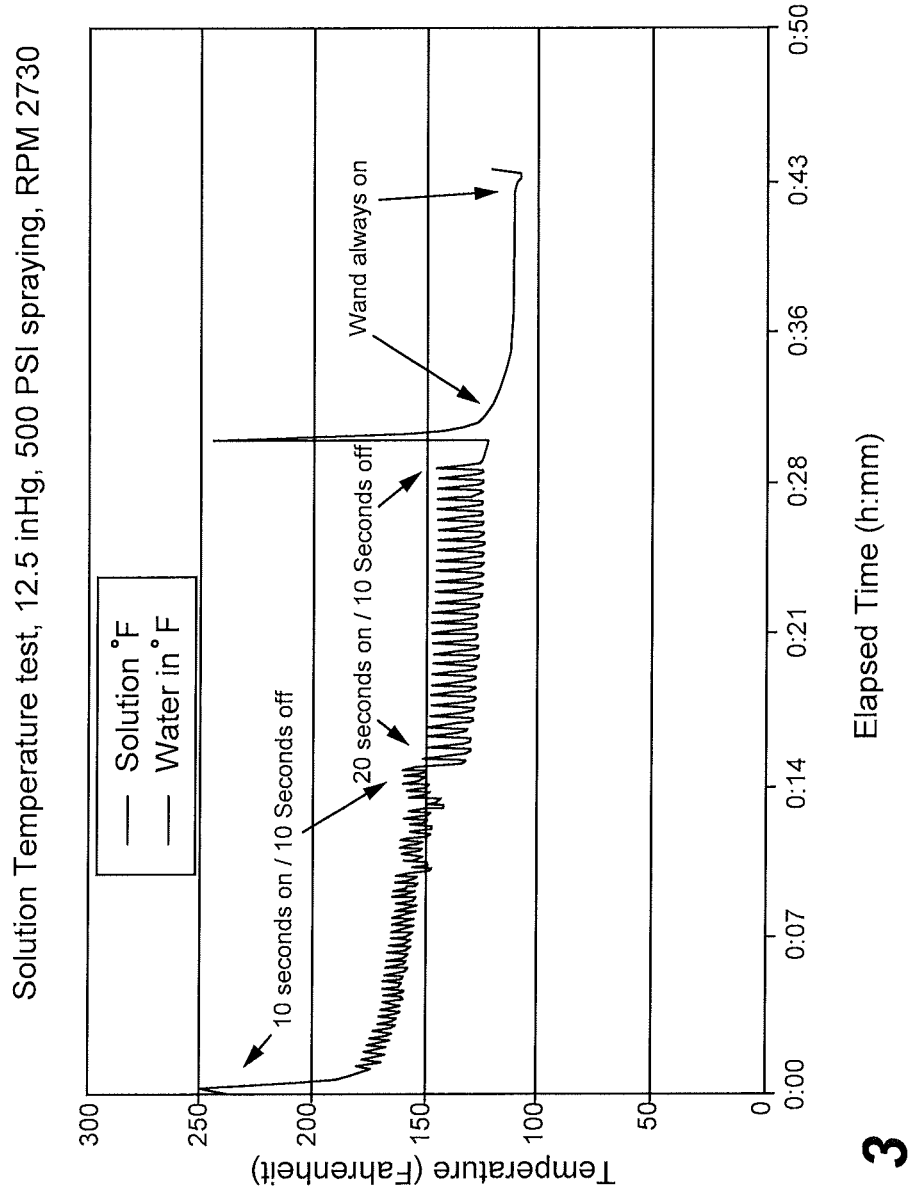
FIG. 3 is a chart showing initial high temperatures of fluids achieved and temperature fluctuations achieved by a tested prior art system.
Figure 4:
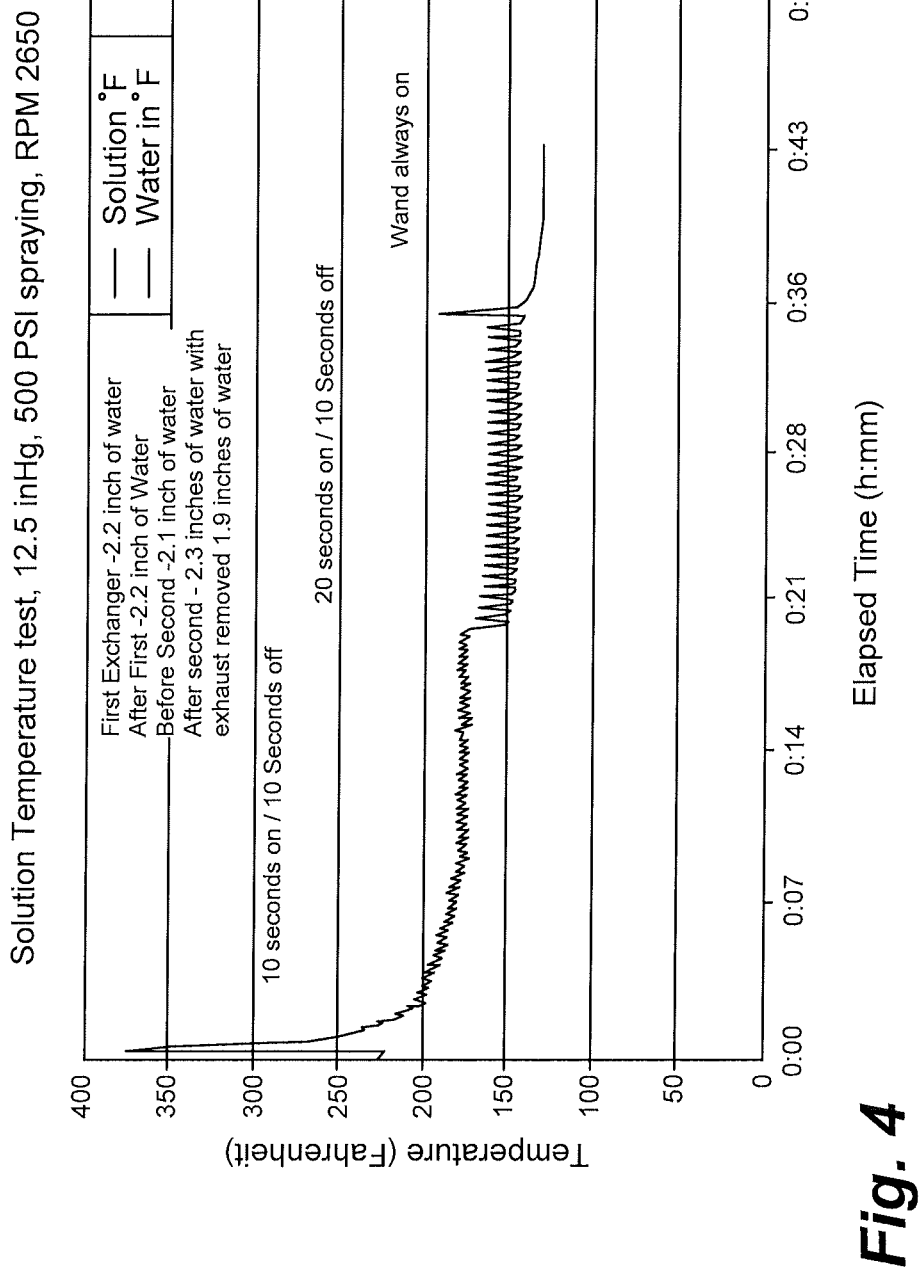
FIG. 4 is a chart showing initial high temperatures of fluids achieved and temperature fluctuations achieved by the system of the present invention.

Additionally, since the portion of the heated fluid from the housing 40 is diverted back to the fluid box 22 is at an overall higher temperature than previously available, the incoming water supply is preheated to a higher overall temperature than was previously possible. The novel arrangement of the exchangers, coupled with the novel supply of organic heated gases, also allows for a readily available supply of hot fluid at a higher temperature than previously available, while the cleaning apparatus 10 is in use. In addition, this also results in less fluctuation in temperature of the heated fluid when the trigger mechanism on the cleaning wand of the wand assembly 60 is activated. As is shown in FIGS. 3 and 4, the temperature of the heated fluid delivered is substantially more stable over time, by approximately 15° to 20° Fahrenheit in a 20 second cycle period and 5° to 10° Fahrenheit in a 10 second cycle period, not achievable by prior art devices, all while maintaining a streamlined, cost efficient design.

It will be appreciated by those skilled in the art that other various modifications could be made to the device without the parting from the spirit in scope of this invention. All such modifications and changes fall within the scope of the claims and are intended to be covered thereby.

What is claimed is:

1. A heat exchanger arrangement for use on a mobile cleaning device, comprising:
    a housing including a first and second exhaust gas opening, and an exhaust gas exit;
    a first and second heat exchanger arranged in serial relationship and enclosed within the housing;
    a third heat exchanger enclosed within the housing and positioned at an angle relative to the first and second heat exchangers and adjacent the first exhaust gas opening;
    a first source of super heated exhaust gas;
    a second source of heated gas;
    wherein the super heated exhaust gas is supplied to the first exhaust gas opening and flows substantially through the third heat exchanger; and wherein the heated gas is supplied to the second exhaust gas opening and mixes within a mixing area of the housing with exhaust gas exiting the third heat exchanger, the mixed gases entering the second and first heat exchangers and exiting the exhaust gas exit.

2. The heat exchanger arrangement of claim 1, wherein said super heated exhaust gas supplied to the first exhaust gas opening is at a higher temperature than the heated gas supplied to the second exhaust gas opening.

3. The heat exchanger arrangement of claim 1, wherein the temperature of the super heated exhaust gas flowing substantially through the third heat exchanger decreases as it exits the third heat exchanger.

4. The heat exchanger arrangement of claim 1, wherein the super heated exhaust gas is supplied by a heat generating unit.

5. The heat exchanger arrangement of claim 4, wherein the heat generating unit is an internal combustion engine.

6. The heat exchanger arrangement of claim 1, wherein the heated gas supplied to the second opening is supplied by a vacuum unit in operation.

7. A system of applying a heated cleaning fluid to a surface, comprising:
    a housing including a first, second and third opening;
    a first and second heat exchanger arranged in serial relationship and enclosed within the housing;
    a third heat exchanger enclosed within the housing and positioned at an angle relative to the first and second heat exchangers and adjacent the first opening;
    a first source of super heated exhaust gas;
    a second source of heated gas;
    the super heated exhaust gas is supplied to the first opening and allowing that gas to flow substantially through the third heat exchanger;
    the heated gas is supplied to the second opening and having that gas pass below the third heat exchanger, mixing in a mixing area of the housing with exhaust gas exiting the third heat exchanger before supplying that mixed gas to the second and first heat exchangers;
    a fluid to be heated is passed through the first, second and third heat exchangers before exiting the third heat exchanger in a heated condition; and
    the heated fluid is passed to a wand assembly.

8. The system of claim 7, wherein the super heated exhaust gas is at a higher temperature than said heated gas supplied to the second opening.

9. The system of claim 7, wherein the temperature of the super heated exhaust gas flowing substantially through the third heat exchanger remains substantially the same as it exits said third heat exchanger.

10. The system of claim 7, wherein the super heated exhaust gas is supplied by a heat generating unit.

11. The system of claim 10, wherein the heat generating unit is an internal combustion engine.

12. The system of claim 7, wherein the fluid first flows from a water inlet into a fluid box for preheating with the fluid that has been passed through the first heat exchanger and diverted to the fluid box.

13. The system of claim 7, further comprising a pump that facilitates the flow of the fluid.

14. The system of claim 7, further a comprising a vacuum unit which recovers and directs fluid that has passed through the cleaning wand to a waste fluid recovery tank; and
    supplies heated gas that results from the fluid recovery to the second exhaust opening.

15. The system of claim 7, further comprising a chemical injection mechanism to inject a volume of chemical solution into the fluid.

16. The system of claim 7, wherein the wand assembly further comprises:
    a check valve to regulate the flow of fluid when activated; and
    a solution outlet for fluid to flow through and onto a surface; and
    a cleaning solution screen to measure at least one of the temperature and composition of said fluid flowing through said solution outlet.

17. The system of claim 7, further comprising a temperature control valve to determine whether the fluid is heated to a temperature exceeding a predetermined temperature.

18. The system of claim 17, further comprising a temperature relief valve that opens and diverts said fluid into a waste recovery tank when the fluid exceeds a predetermined temperature.

19. The system of claim 17, wherein a temperature balance orifice is placed substantially near the wand assembly to maintain at least a minimum amount of fluid circulation in the system.

20. The system of claim 7, wherein the temperature of the fluid passing to the wand assembly fluctuates approximately 15° to 20° Fahrenheit over an approximately 20 second period.

21. The system of claim 7, wherein the temperature of the fluid passing to the wand assembly fluctuates approximately 5° to 10° Fahrenheit over an approximately 10 second period.

22. The system of claim 7, further comprising a pressure gauge to monitor the pressure of the fluid;
    a pressure regulator to adjust the pressure of the fluid; and
    a pulse hose connected to the pressure regulator.

* * * * *